No. 881,493. PATENTED MAR. 10, 1908.
C. G. A. SCHMIDT, Jr.
DRIVE CHAIN.
APPLICATION FILED JUNE 27, 1907.
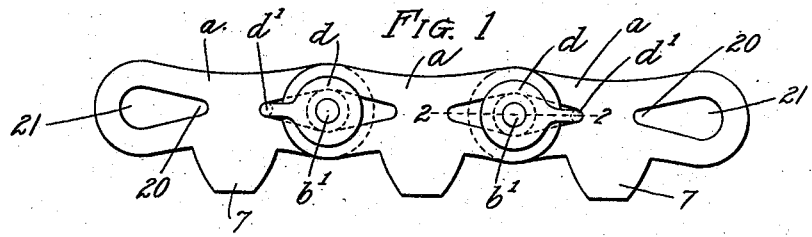
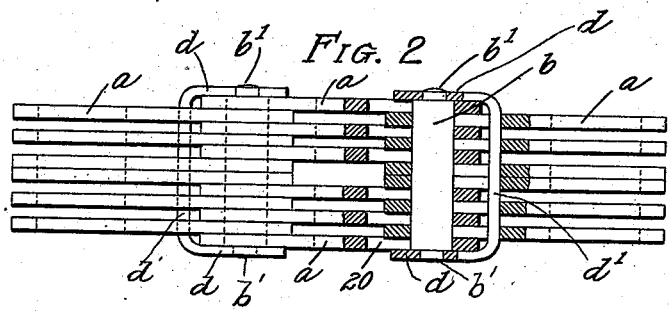
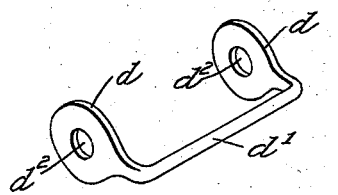
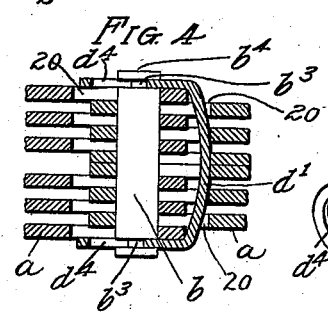
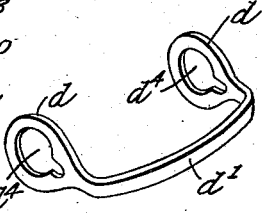
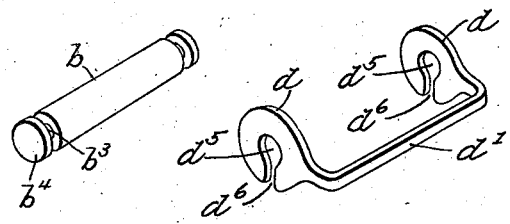
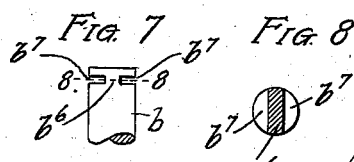
WITNESSES,
Forest Roulstone.
E. Batchelder.
INVENTOR,
Carl G. A. Schmidt Jr.
by Wright Brown Quimby May
Attys.
THE NORRIS PETERS CO., WASHINGTON, D. C.

UNITED STATES PATENT OFFICE.

CARL G. A. SCHMIDT, JR., OF NEW YORK, N. Y.

DRIVE-CHAIN.

No. 881,493.    Specification of Letters Patent.    Patented March 10, 1908.

Application filed June 27, 1907. Serial No. 381,042.

*To all whom it may concern:*

Be it known that I, CARL G. A. SCHMIDT, Jr., of New York, in the county of New York and State of New York, have invented certain new and useful Improvements in Drive-Chains, of which the following is a specification.

This invention relates to sprocket chains composed of jointed links which are adapted to engage teeth of sprocket wheels, and to impart motion from a driving wheel to a driven wheel, the links being articulately connected by pins, each of which is independently removable to permit the chain to be disconnected or opened at any desired point, the construction being such that the parts of the chain can be assembled and disconnected without the use of tools and without cutting or otherwise changing the form of any of the component parts of the chain.

The invention has for its object to provide improved means for detachably securing the link-connecting pins in their operative relation to the links, and is embodied in a chain comprising links, link-connecting pivot pins and pin retainers, of which one is provided for each pin, each retainer being made practically as a single piece or part, and engaging opposite end portions of a pin, so that the number of separate parts is reduced to the minimum by reducing the number of retainers so that they equal the number of pins, instead of requiring two independent retainers for each pin, all as hereinafter described.

Of the accompanying drawings, forming a part of this specification,—Figure 1 represents an edge view of a portion of a chain embodying my invention. Fig. 2 represents a plan view of a portion shown in Fig. 1, a part of Fig. 2 being a section on line 2—2 of Fig. 1. Fig. 3 represents a perspective view of one of the pin retainers shown in Figs. 1 and 2. Fig. 4 represents a view similar to a portion of Fig. 1, showing certain changes in the form of the link-connecting pin and the pin retainer which coöperates therewith. Fig. 5 represents a perspective view of the form of link retainer shown in Fig. 4. Fig. 6 represents a perspective view showing another form of link retainer embodying my invention. Fig. 7 represents a side elevation of a portion of a pin which differs in minor respects from the pin shown in the preceding figures. Fig. 8 represents a section on line 8—8 of Fig. 7. Figs. 9 and 10 represent perspective views of the forms of pin shown in Figs. 2 and 4.

The same letters of reference indicate the same parts in all the figures.

In the drawings, $a$ $a$ represent toothed links of my improved chain, said links being preferably flat blanks of steel having orifices 2 2 in their end portions, each link having at one edge a projection 7 constituting a gear tooth. The links are articulately connected by transverse pins $b$ adapted to be removably inserted in the orifices 21, each pin having a free sliding fit so that it can be readily inserted in and removed from the orifices 21, to enable the continuity of the chain to be interrupted at any point by removing a pin at that point, and separating the links connected thereby. The chain is provided with means for detachably holding the pins in engagement with the links, and preventing their accidental displacement, said means being a series of pin retainers of which one is provided for each pin, each retainer being adapted to detachably engage the two ends of the accompanying pin, so that the number of pin retainers required in a complete chain is the same as the number of pins required.

In the construction shown in Figures 1, 2 and 3, the pins $b$ are provided with reduced end portions $b'$, and each pin retainer is composed of two ears $d$ $d$ connected by a bar $d'$ adapted to extend across the chain, and preferably through the orifices 21 which are provided in the links to receive the pins $b$, said orifices being elongated, as clearly shown at 20 in Figs. 1 and 2. The ears $d$ are provided with orifices $d^2$ adapted to receive the reduced end portions $b'$ of the pins, the inner sides of the ears bearing on the shoulders formed by the reduction of the end portions of the pins. The ears $d$ and the connecting cross bar $d'$ are sufficiently resilient to enable the ears to be sprung on to the reduced ends $b'$. When the ears are engaged with the reduced ends $b'$, they prevent endwise displacement of the pin in either direction. When it is desired to remove the pin, the ears $d$ are sprung outwardly out of engagement with the reduced ends of the pin, releasing the latter so that it may be pushed endwise out of the orifices in the links.

In the construction shown in Figs. 4 and 5, the end portions of the pin $b$ are reduced by forming peripheral grooves therein, so that at each end of the pin there is a head $b^4$ of the full diameter of the pin, and a neck $b^3$ of smaller diameter connecting the head with the body of the pin. The ears $d$ are in this case provided with key-hole shaped orifices $d^4$, the narrower portions of which are of sufficient width to receive the necks $b^3$, while the larger portions are adapted to pass over the heads $b^4$. The connecting cross bar $d'$ is in this case curved so that it bears at its central portion against the outer ends of the elongated orifices 21 of one row of links, the curved form of the cross bar enabling it to act as a spring which holds the narrower portions of the orifices $d^4$ yieldingly in engagement with the necks $b^3$ so that in order to disengage the retainer from the pin, the ears $d$ must be pushed in the direction required to partially straighten the curved cross bar $d'$, thus bringing the larger portions of the orifices $d^4$ into position to be sprung off over the heads $b^4$ of the pins.

In Fig. 6 I show the ears $d$ provided with orifices $d^5$, adapted to engage the necks $b^3$ of the pins, and openings $d^6$ extending from said orifices through the margins of the heads, said openings $d^6$ being narrower than the diameter of the necks $b^3$. In applying this form of retainer to a pin, the ears are moved edgewise across the necks $b^3$, the resilience of the ears enabling the openings $d^6$ to yield until they pass the necks $b^3$, said openings then closing and holding the ears in engagement with the pins.

In Figs. 7 and 8 I show the pin provided with a neck $b^6$ of a rectangular or irregular cross section, adapted to engage the narrower portions of the key-hole-shaped orifices $d^4$, shown in Fig. 5, so that the pin is caused to turn with the retainer. The necks $b^6$ may be conveniently formed by cutting slots $b^7$ in opposite sides of the pin.

The pin-retaining device, adapted to simultaneously engage both ends of a link-connecting pin, as herein shown and described, extends across or spans the chain so that I have referred to it hereinafter as a spanner. It should be understood, however, that my invention is not limited to either of the specific forms of one-part pin retainer here shown, as the construction of the pin retainer may be variously modified without departing from the spirit of the invention. In using the term one-part as applied to the pin retainer, I do not mean to limit myself to a retainer in which the pin-engaging ears and the connecting cross bar are formed in one integral part, it being obvious that the members of the retainer may be separately formed and riveted or otherwise suitably secured together.

I claim:

1. A chain comprising links, link-connecting pivot pins, and pin-retaining spanners engaged with the end portions of the pins.

2. A chain comprising links, link-connecting pivot pins, and detachable pin-retaining spanners, each composed of a pair of ears adapted to engage the end portions of a pin, and a cross bar connecting said ears.

3. A drive chain comprising toothed links, link-connecting pivot pins having reduced end portions, and pin-retaining spanners having ears engaged with the end portions of the pins.

4. A drive chain comprising toothed links, removable link-connecting pivot pins having reduced end portions, and pin-retaining spanners, each composed of a pair of ears adapted to engage the reduced portions of a pin, and an ear-connecting cross bar extending through orifices in the links across the chain.

5. A drive chain comprising toothed links, each having elongated pin-receiving orifices in its end portions, pivot pins removably inserted in said orifices, and provided with reduced end portions forming shoulders on the pins, and pin-retaining spanners composed of ears engaging the reduced portions of the pins, and bearing against said shoulders, and ear-connecting cross bars passing through the said elongated orifices.

6. A drive chain comprising multiple links, each having pin-receiving orifices in its end portions, pivot pins with reduced end portions of irregular cross section, and pin-retaining spanners composed of ears having orifices formed to engage said end portions, and cross bars connecting said ears, the said orifices conforming to the cross section of the reduced end portions, whereby the pins and ears are interlocked and caused to turn together.

7. A chain comprising links, link-connecting pivot pins, and pin retainers, each adapted to engage the end portions of one pin.

8. A chain comprising links, link-connecting pins, and pin-engaging ears coupled together in pairs, the ears of each pair engaging the end portions of one pin.

9. A chain comprising links, link-connecting pins having reduced end portions of irregular cross section, and pin-retaining spanners, each composed of ears having key-hole shaped orifices adapted to engage the said reduced end portions, and a cross bar connecting said ears and passing through orifices in the links, said cross bar being curved and acting as a spring to hold the ears in engagement with the pins.

10. As an article of manufacture, a link retainer having ears adapted to simultaneously engage both end portions of a link connecting pivot pin.

11. As an article of manufacture, a pin-retaining spanner comprising ears adapted to engage the end portions of a pin, and an ear-connecting cross bar.

In testimony whereof I have affixed my signature, in presence of two witnesses.

CARL G. A. SCHMIDT, Jr.

Witnesses:
   CORA ELIZABETH SCHMIDT,
   DAVID MOFFAT MYERS.